United States Patent
Lee et al.

(10) Patent No.: US 9,986,532 B2
(45) Date of Patent: May 29, 2018

(54) ELECTRONIC DEVICE GROUP PAGING METHOD AND ELECTRONIC DEVICE THEREOF

(71) Applicant: Samsung Electronics Co., Ltd., Gyeonggi-do (KR)

(72) Inventors: Sung-Jun Lee, Gyeonggi-do (KR); Hye-Jeong Kim, Gyeonggi-do (KR); Jeong-Don Kang, Gyeonggi-do (KR); Ji-Eun Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days. days.

(21) Appl. No.: 15/324,995

(22) PCT Filed: Jul. 7, 2014

(86) PCT No.: PCT/KR2014/006073
§ 371 (c)(1),
(2) Date: Jan. 9, 2017

(87) PCT Pub. No.: WO2016/006721
PCT Pub. Date: Jan. 14, 2016

(65) Prior Publication Data
US 2017/0215169 A1    Jul. 27, 2017

(51) Int. Cl.
*H04B 7/00* (2006.01)
*H04W 68/02* (2009.01)
(Continued)

(52) U.S. Cl.
CPC .......... *H04W 68/02* (2013.01); *H04W 4/005* (2013.01); *H04W 40/005* (2013.01);
(Continued)

(58) Field of Classification Search
CPC ... H04W 68/02; H04W 40/005; H04W 4/005; H04W 72/121; H04W 76/048; H04W 61/6054; H04W 8/04
See application file for complete search history.

(56) References Cited

U.S. PATENT DOCUMENTS

2006/0284969 A1* 12/2006 Kim ...................... G06F 21/316
348/14.01
2008/0182596 A1*  7/2008 Wang .................. H04W 68/025
455/458
(Continued)

FOREIGN PATENT DOCUMENTS

JP        2013524563        6/2013
KR        20090025517       3/2009
(Continued)

OTHER PUBLICATIONS

PCT/ISA/210 Search Report issued on PCT/KR2014/006073 (pp. 3).
(Continued)

*Primary Examiner* — Dominic Rego
(74) *Attorney, Agent, or Firm* — The Farrell Law Firm, P.C.

(57) ABSTRACT

Various examples of the present invention relate to an electronic device group paging method and an electronic device thereof, and an electronic device operating method can comprise the steps of: converting, in a discontinuous reception (DRX) mode, the electronic device from an idle state into a wakeup state when it is time to check group paging; analyzing, in the wakeup state, the validity of a group paging message received through machine type communication (MTC); and performing a specific function according to the group paging message if the group paging message is valid. In addition, the various examples of the
(Continued)

present invention also include the aforementioned example and other examples.

20 Claims, 14 Drawing Sheets

(51) Int. Cl.
*H04W 40/00* (2009.01)
*H04W 4/00* (2018.01)
*H04W 72/12* (2009.01)
*H04W 76/04* (2009.01)
*H04L 29/12* (2006.01)
*H04W 8/04* (2009.01)

(52) U.S. Cl.
CPC ....... *H04W 72/121* (2013.01); *H04L 61/6054* (2013.01); *H04W 8/04* (2013.01); *H04W 76/048* (2013.01)

(56) References Cited

U.S. PATENT DOCUMENTS

| | | | |
|---|---|---|---|
| 2009/0125332 A1* | 5/2009 | Martin | G06Q 10/00 705/3 |
| 2009/0221284 A1* | 9/2009 | Kim | H04W 68/025 455/426.1 |
| 2010/0210284 A1 | 8/2010 | Na et al. | |
| 2010/0331019 A1* | 12/2010 | Bhattacharjee | H04W 52/0229 455/458 |
| 2012/0040700 A1 | 2/2012 | Gomes et al. | |
| 2012/0275401 A1* | 11/2012 | Sun | H04W 72/04 370/329 |
| 2012/0302230 A1 | 11/2012 | Lim et al. | |
| 2012/0329485 A1 | 12/2012 | Lee et al. | |
| 2013/0012244 A1* | 1/2013 | Lee | H04W 52/346 455/458 |
| 2013/0021970 A1* | 1/2013 | Lei | H04W 4/005 370/328 |
| 2013/0115977 A1* | 5/2013 | Chandramouli | H04W 68/00 455/458 |
| 2013/0136072 A1* | 5/2013 | Bachmann | H04W 4/00 370/329 |
| 2014/0011527 A1* | 1/2014 | Xu | H04W 4/08 455/466 |
| 2014/0112221 A1* | 4/2014 | Verger | H04W 52/0216 370/311 |
| 2015/0050955 A1 | 2/2015 | Kim et al. | |
| 2015/0156624 A1* | 6/2015 | Yang | H04W 68/00 455/411 |
| 2017/0099618 A1* | 4/2017 | Guo | H04W 36/0022 |

FOREIGN PATENT DOCUMENTS

| | | |
|---|---|---|
| KR | 20110082486 | 7/2011 |
| WO | WO 2011099769 | 8/2011 |
| WO | WO 2011112051 | 9/2011 |
| WO | WO 2013141599 | 9/2013 |

OTHER PUBLICATIONS

PCT/ISA/237 Written Opinion issued on PCT/KR2014/006073 (pp. 6).

3GPP TS 23.008 V8.6.0 (Jun. 2009), 3rd Generation Partnership Project; Technical Specification Group Core Network and Terminals; Organization of subscriber data (Release 8), Copyright 2009, 3GPP Organizational Partners (ARIB, ATIS, CCSA, ETSI, TTA, TTC), pp. 93.

* cited by examiner

Overview of data used for PS Network Access Mode (600)

| Parameter | HSS | MME | ... | TYPE |
|---|---|---|---|---|
| IMSI | M | C | --- | P |
| NW Access Mode | M | C | --- | P |
| IMSI Unauthenticated indicator | - | C | --- | T |
| International MS ISDN number | C | C | --- | P |
| P-TMSI | - | C | --- | T |
| --- | - | - | --- | - |
| Group ID | M | - | --- | P |
| --- | - | - | --- | - |

FIG.6

Individual paging check time value (900)

SFN mod T = (T div N)*UE_ID mod (N), UE_ID = IMSI mod 1024

Group paging check time value (910)

SFN mod T = (T div N)*GROUP_ID mod (N), GROUP_ID = Pseudo IMSI mod 1024

FIG.9

# ELECTRONIC DEVICE GROUP PAGING METHOD AND ELECTRONIC DEVICE THEREOF

PRIORITY

This application is a National Phase Entry of PCT International Application No. PCT/KR2014/006073, which was filed on Jul. 7, 2014, the contents of which are incorporated herein by reference.

TECHNICAL FIELD

The present invention relates to a method of paying a group by an electronic device and an electronic device thereof.

BACKGROUND ART

Machine-To-Machine (M2M) communication may refer to communication in which data transmission/reception between entities such as a communication terminal, a communication server, or the like is possible without any interaction between users and may be called Machine Type Communication (MTC). Hereinafter, the machine type communication is referred to as "MTC". The MTC may be used in various technology fields, for example, metering water, metering gas, measuring temperature, and measuring atmosphere.

A message transmission scheme in the MTC may include a broadcasting scheme and a paging scheme. The broadcasting scheme may correspond to a scheme in which a predetermined message is transmitted to a plurality of unspecific terminals and may cause congestion on the network.

The paging scheme may correspond to a scheme in which a predetermined message is transmitted to specific terminals and may reduce congestion on the network. However, since the predetermined message is transmitted to the specific terminal in the paging scheme, if the number of specific terminals to receive the same one message is larger, the same one message should be transmitted by the number of times corresponding to the number of specific terminals.

DETAILED DESCRIPTION OF THE INVENTION

Technical Problem

Various embodiments of the present invention provide, for example, a group paging method of an electronic device for grouping a plurality of communication terminals in a machine type communication (MTC) and transmitting the same one message to the plurality of grouped communication terminals at a time, and an electronic device thereof.

Technical Solution

According to various embodiments of the present invention, a method of operating an electronic device may include: when a group paging check time arrives in a discontinuous reception (DRX) mode, switching from an idle state to a wakeup state; analyzing the validity of a group paging message received through a machine type communication (MTC) in the wakeup state; and when the group paging message is valid, performing a particular function according to the group paging message.

According to various embodiments of the present invention, an electronic device may include: a communication module; and a processor configured to control the communication module, wherein the processor switches from an idle state to a wakeup state when a group paging check time arrives in a discontinuous reception (DRX) mode, analyzes the validity of a group paging message received through a machine type communication (MTC) in the wakeup state, and performs a particular function according to the group paging message when the group paging message is valid.

Effects of the Invention

According to various embodiments of the present invention, it is possible to group a plurality of communication terminals in machine type communication (MTC) and transmit the same one message to the plurality of grouped communication terminals at one time, thereby efficiently reducing congestion on the network.

According to various embodiments of the present invention, various types of electronic devices, such as a smart phone, a tablet PC, and various measuring devices, may analyze the validity of a group paging message received through machine type communication (MTC) and then, when the group paging message is valid, perform a particular function according to the group paging message.

BRIEF DESCRIPTION OF THE DRAWINGS

FIG. 6 illustrates data used in a PS network access mode according to various embodiments of the present invention;

FIG. 9 illustrates calculation formulas for calculating an individual paging check time and a group paging check time according to various embodiments of the present invention;

MODE FOR CARRYING OUT THE INVENTION

Figure 1:
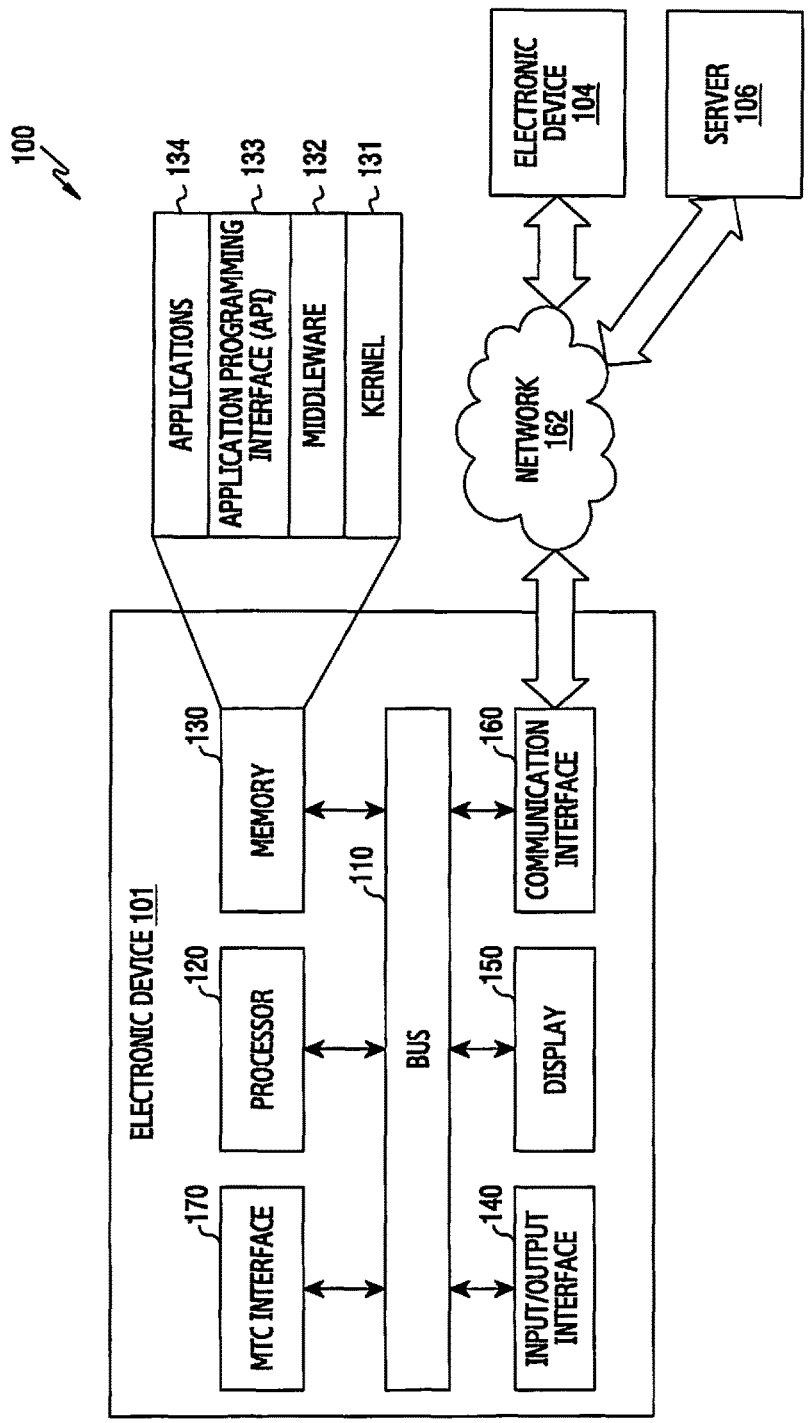
FIG. 1 illustrates a network environment including an electronic device according to various embodiments of the present invention.

Hereinafter, various embodiments of the present invention will be described with reference to the accompanying drawings. The present invention may have various embodiments, and modifications and changes may be made therein. Therefore, the present invention will be described in detail with reference to particular embodiments shown in the accompanying drawings. However, it should be understood that there is no intent to limit various embodiments of the present invention to the particular embodiments disclosed herein, but the present invention should be construed to cover all modifications, equivalents, and/or alternatives falling within the spirit and scope of the various embodiments of the present invention. In the description of the drawings, identical or similar reference numerals are used to designate identical or similar elements.

As used in various embodiments of the present invention, the expressions "include", "may include" and other conjugates refer to the existence of a corresponding disclosed function, operation, or constituent element, and do not limit one or more additional functions, operations, or constituent elements. Further, as used in various embodiments of the present invention, the terms "include", "have", and their conjugates are intended merely to denote a certain feature, numeral, step, operation, element, component, or a combination thereof, and should not be construed to initially exclude the existence of or a possibility of addition of one or more other features, numerals, steps, operations, elements, components, or combinations thereof.

Further, as used in various embodiments of the present invention, the expression "or" includes any or all combinations of words enumerated together. For example, the expression "A or B" may include A, may include B, or may include both A and B. While expressions including ordinal numbers, such as "first" and "second", as used in various embodiments of the present invention may modify various constituent elements, such constituent elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, a first element could be termed a second element, and similarly, a second element could be also termed a first element without departing from the scope of the present invention.

In the case where an element is referred to as being "connected" or "accessed" to other elements, it should be understood that not only the element is directly connected or accessed to the other elements, but also another element may exist between them. Contrarily, when an element is referred to as being "directly coupled" or "directly connected" to any other element, it should be understood that no element is interposed therebetween.

The terms as used in various embodiments of the present invention are merely for the purpose of describing particular embodiments and are not intended to limit the various embodiments of the present invention. As used herein, the singular forms are intended to include the plural forms as well, unless the context clearly indicates otherwise.

Unless defined otherwise, all terms used herein, including technical terms and scientific terms, have the same meaning as commonly understood by a person of ordinary skill in the art to which various embodiments of the present invention pertain. Such terms as those defined in a generally used dictionary are to be interpreted to have the meanings equal to the contextual meanings in the relevant field of art, and are not to be interpreted to have ideal or excessively formal meanings unless clearly defined in various embodiments of the present invention.

An electronic device according to various embodiments of the present invention may be a device including a communication function. For example, the electronic device may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, a wearable device (e.g., a head-mounted-device (HMD) such as electronic glasses, electronic clothes, an electronic bracelet, an electronic necklace, an electronic appcessory, an electronic tattoo, or a smart watch).

According to some embodiments, the electronic device may be a smart home appliance with a communication function. The smart home appliances may include at least one of, for example, televisions, digital video disk (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to some embodiments, the electronic device may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a shop.

According to some embodiments, the electronic device may include at least one of a part of furniture or a building/structure having a communication function, an electronic board, an electronic signature receiving device, a projector, and various kinds of measuring instruments (e.g., a water meter, an electric meter, a gas meter, a radio wave meter, and the like). The input data may include at least one of handwriting, a text, and a picture. The electronic device according to various embodiments of the present invention may be a combination of one or more of the aforementioned various devices. Further, the electronic device according to various embodiments of the present invention may be a flexible device. Further, it will be apparent to those skilled in the art that the electronic device according to various embodiments of the present invention is not limited to the aforementioned devices.

Hereinafter, an electronic device according to various embodiments of the present invention will be described with reference to the accompanying drawings. The term "user" as used in various embodiments of the present invention may refer to a person who uses an electronic device or a device (e.g., artificial intelligence electronic device) that uses an electronic device.

FIG. 1 illustrates a network environment 100 including an electronic device 101 according to various embodiments of the present invention. Referring to FIG. 1, the electronic device 101 may include a bus 110, a processor 120, a memory 130, an input/output interface 140, a display 150, a communication interface 160, and an MTC interface 170.

The MTC interface 170 is an element for transmitting and/or receiving an MTC message through an MTC network, and may be included in the communication interface 160 or may be a separate element. The MTC interface 170 may interwork with the processor 120. The bus 110 may be a circuit which interconnects the above-described elements and delivers a communication (for example, a control message) between the above-described elements.

The processor 120 may receive, for example, instructions from other elements (for example, the memory 130, the input/output interface 140, the display 150, and the communication interface 160) through the bus 110, analyze the received instructions, and execute calculations or data processing according to the analyzed instructions.

The memory 130 may store instructions or data received from or created by the processor 120 or other elements (for example, the input/output interface 140, the display 150, and the communication interface 160). The memory 130 may include programming modules, for example, a kernel 131, middleware 132, an Application Programming Interface (API) 133, or applications 134. Each of the aforementioned programming modules may be formed of software, firmware, hardware, or a combination of at least two thereof.

The kernel 131 may control or manage system resources (for example, the bus 110, the processor 120, or the memory 130) used for executing an operation or a function implemented in the remaining other programming modules, for example, the middleware 132, the API 133, or the application 134. In addition, the kernel 131 may provide an interface through which the middleware 132, the API 133, or the applications 134 may control or manage the individual components of the electronic device 101 while accessing the individual components.

The middleware 132 may perform a relay function of allowing the API 133 or the application 134 to communicate with the kernel 131 to exchange data therewith. Further, in association with task requests received from the applications 134, the middleware 132 may control (for example, scheduling or load-balancing) the task requests by using, for example, a method of assigning, to at least one of the applications 134, a priority for using system resources (for example, the bus 110, the processor 120, the memory 130, or the like) of the electronic device 101.

The API 133 corresponds to an interface by which the applications 134 controls a function provided by the kernel 131 or the middleware 132 and may include, for example, at least one interface or function (for example, instructions) for a file control, window control, image processing, or text control.

According to various embodiments of the present invention, the applications 134 may include a Short Message Service (SMS)/Multimedia Message Service (MMS) application, an e-mail application, a calendar application, an alarm application, a health care application (for example, an application for measuring an amount of exercise or blood sugar), and an environmental information application (for example, an application for providing an atmospheric pressure, humidity, temperature, and the like). Additionally or alternately, the applications 134 may be an application related to the exchange of information between the electronic device 101 and an external electronic device (for example, an electronic device 104). The application related to exchanging information may include, for example, a notification relay application for transferring predetermined information to the external electronic device, or a device management application for managing the external electronic device.

For example, the notification relay application may include a function of transferring, to the external electronic device (for example, the electronic device 104), notification information generated in other applications of the electronic device 101 (for example, an SMS/MMS application, an e-mail application, a health management application, an environmental information application, and the like). Additionally or alternatively, the notification relay application may receive notification information from, for example, an external electronic device (for example, the electronic device 104) and may provide the received notification information to a user. The device management application may manage (for example, install, delete, or update), for example, functions for at least a part of the external electronic device (for example, the electronic device 104) communicating with the electronic device 101 (for example, turning on/off the external electronic device itself (or some elements thereof) or adjusting the brightness (or resolution) of a display), applications operating in the external electronic device, or services (for example, a telephone call service or a message service) provided from the external electronic device.

According to various embodiments of the present invention, the applications 134 may include an application designated according to an attribute (for example, a type of the electrode device) of the external electronic device (for example, the electronic device 104). For example, when the external electronic device is an MP3 player, the applications 134 may include an application related to the reproduction of music. Similarly, when the external electronic device is a mobile medical appliance, the applications 134 may include an application related to health care. According to an embodiment, the applications 134 may include at least one of applications specified to the electronic device 101 and applications received from an external electronic device (for example, a server 106 or the electronic device 104).

The input/output interface 140 may transfer instructions or data input from a user through an input/output device (for example, a sensor, a keyboard, or a touch screen) to the processor 120, the memory 130, and the communication interface 160 through, for example, the bus 110. For example, the input/output interface 140 may provide, to the processor 120, data for a user's touch input through the touch screen. In addition, through the input/output device (for example, a speaker or a display), the input/output interface 140 may output instructions or data received from the processor 120, the memory 130, or the communication interface 160 through the bus 110. For example, the input/output interface 140 may output voice data, processed through the processor 120, to a user through a speaker.

The display 150 may display various pieces of information (for example, multimedia data or text data) to a user. The communication interface 160 may connect communication between the electronic device 101 and the external electronic device (for example, the electronic device 104 or the server 106). For example, the communication interface 160 may be connected to the network 162 through wireless communication or wired communication to communicate with the external device. The wireless communication may include at least one of, for example, Wi-Fi, Bluetooth (BT), Near Field Communication (NFC), a Global Positioning System (GPS), and cellular communication (for example, LTE, LTE-A, CDMA, WCDMA, UMTS, WiBro, GSM, and the like). The wired communication may include at least one of, for example, a universal serial bus (USB), a high definition multimedia interface (HDMI), recommended standard 232 (RS-232), and a plain old telephone Service (POTS).

According to an embodiment of the present invention, the network 162 may be a telecommunication network. The communication network may include at least one of a computer network, the Internet, the Internet of things, and a telephone network. According to an embodiment, a protocol (for example, a transport layer protocol, data link layer protocol, or a physical layer protocol) for communication between the electronic device 101 and the external device may be supported by at least one of the application 134, the application programming interface 133, the middleware 132, the kernel 131, and the communication interface 160.

Figure 2:
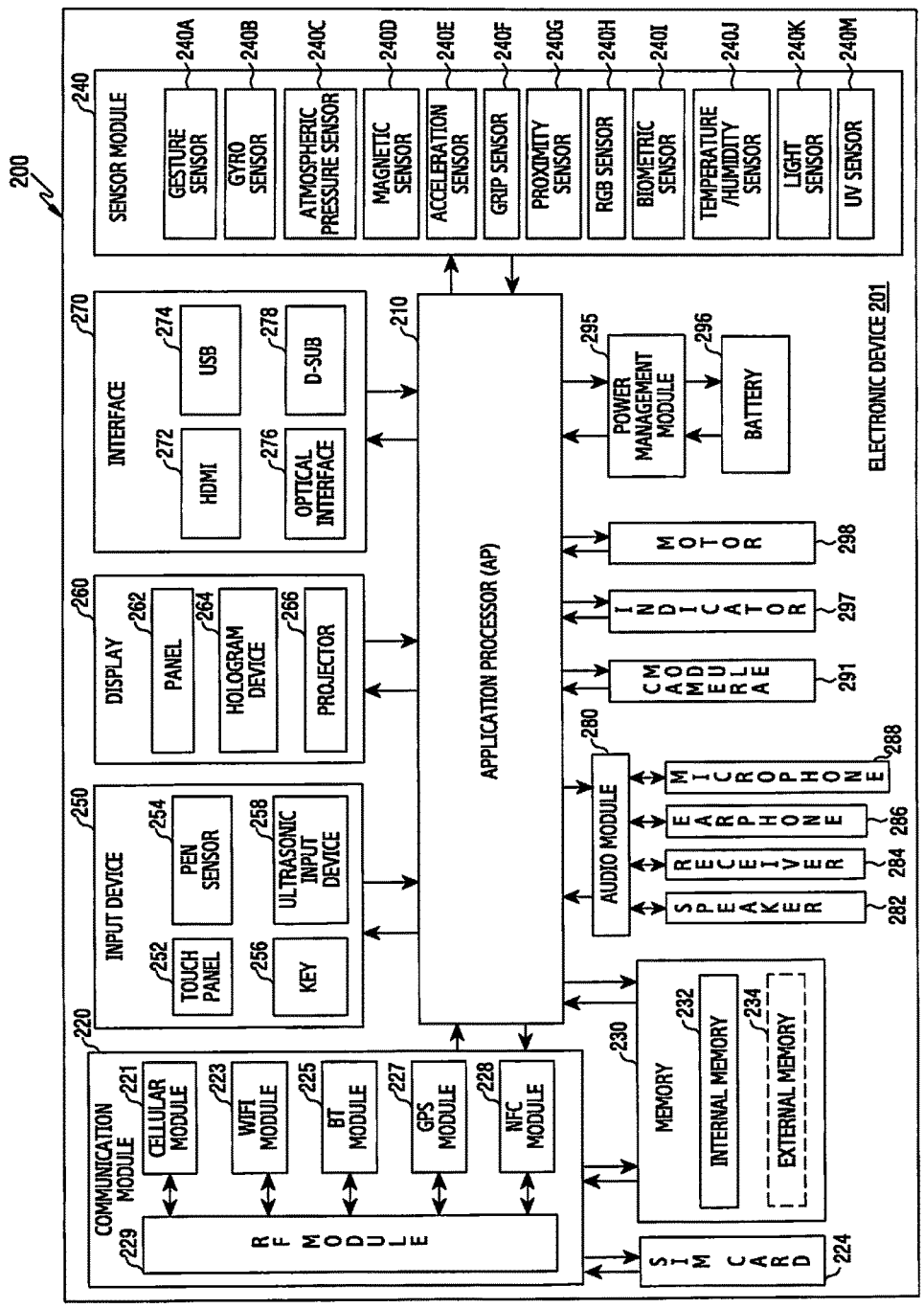
FIG. 2 is a block diagram of an electronic device according to various embodiments of the present invention.

FIG. 2 is a block diagram of an electronic device 201 according to various embodiments of the present invention. An electronic device 201 may form, for example, an entirety or a part of the electronic device 101 illustrated in FIG. 1. Referring to FIG. 2, the electronic device 201 may include at least one Application Processor (AP) 210, a communication module 220, a Subscriber Identifier Module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may control a plurality of hardware or software elements connected to the AP 210 by driving an operating system or an application program, and may process various types of data including multimedia data and perform calculations. The AP 210 may be implemented as, for example, a System on Chip (SoC). According to an embodiment, the AP 210 may further include a graphic processing unit (GPU) (not illustrated).

The communication module 220 (for example, the communication interface 160) may perform data transmission/reception in communication between the electronic device 201 (for example, the electronic device 101) and other electronic devices (for example, the electronic device 104 and the server 106) connected thereto through a network. According to an embodiment, the communication module 220 may include a cellular module 221, a Wi-Fi module 223, a BT module 225, a GPS module 227, an NFC module 228, and a Radio Frequency (RF) module 229.

The cellular module 221 may provide a voice call, a video call, a Short Message Service (SMS), or an Internet service through a communication network (for example, LTE, LTE-A, CDMA, WCDMA, UMTS, WiBro, OR GSM). Further, the cellular module 221 may perform identification and authentication of electronic devices in a communication network using, for example, a subscriber identification module (for example, the SIM card 224). According to one embodiment, the cellular module 221 may perform at least some functions which can be provided by the AP 210. For example, the cellular module 221 may perform at least some of the multimedia control functions.

According to an embodiment of the present invention, the cellular module 221 may include a Communication Processor (CP). Furthermore, the cellular module 221 may be implemented as, for example, an SoC. In FIG. 2, the elements, such as the cellular module 221 (for example, a communication processor), the memory 230, and the power management module 295, are illustrated to be separate from the AP 210. However, according to an embodiment, the AP 210 may be implemented to include at least some of the aforementioned elements (for example, the cellular module 221).

According to an embodiment of the present invention, the AP 210 or the cellular module 221 (for example, the CP) may load instructions or data received from at least one of a non-volatile memory and other components connected thereto into a volatile memory, and may process the loaded instructions or data. Furthermore, the AP 210 or the cellular module 221 may store, in a non-volatile memory, data received from or generated by at least one of other component elements.

The Wi-Fi module 223, the BT module 225, the GPS module 227, and the NFC module 228 may include, for example, a processor for processing data transmitted/received through a corresponding module. In FIG. 2, the cellular module 221, the Wi-Fi module 223, the BT module 225, the GPS module 227, and the NFC module 228 are illustrated as separate blocks. However, according to an embodiment, at least some (for example, two or more) of the cellular module 221, the Wi-Fi module 223, the BT module 225, the GPS module 227, and the NFC module 228 may be included in one integrated chip (IC) or one IC package. For example, at least some (for example, the communication processor corresponding to the cellular module 221 and the Wi-Fi processor corresponding to the Wi-Fi module 223) of the processors corresponding to the cellular module 221, the Wi-Fi module 223, the BT module 225, the GPS module 227, and the NFC module 228 may be implemented as one SoC.

The RF module 229 may transmit/receive data, for example, an RF signal. Although not illustrated, the RF module 229 may, for example, include a transceiver, a power amp module (PAM), a frequency filter, a low noise amplifier (LNA), or the like. Also, the RF module 229 may further include. Further, the RF module 229 may further include a component for transmitting and receiving electromagnetic waves in a free space in a wireless communication, for example, a conductor, a conductive wire, or the like. Although the cellular module 221, the Wi-Fi module 223, the BT module 225, the NFC module 227, and the GPS module 228 share one RF module 229 in FIG. 2, at least one of the cellular module 221, the Wi-Fi module 223, the BT module 225, the NFC module 227, and the GPS module 228 may transmit/receive an RF signal through a separate RF module according to an embodiment.

The SIM card 224 may be a card including a subscriber identification module, and may be inserted into a slot formed in a particular portion of the electronic device. The SIM card 224 may include unique identification information (for example, an Integrated Circuit Card IDentifier (ICCID)) or subscriber information, for example, International Mobile Subscriber Identity (IMSI).

The memory 230 (for example, the memory 130) may include an internal memory 232 or an external memory 234. The internal memory 232 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, and the like).

According to an embodiment, the internal memory 232 may be a Solid State Drive (SSD). The external memory 234 may further include a flash drive, for example, a Compact Flash (CF), a Secure Digital (SD), a Micro Secure Digital (Micro-SD), a Mini Secure Digital (Mini-SD), an extreme Digital (xD), a memory stick, or the like. The external memory 234 may be functionally connected with the electronic device 201 through various interfaces. According to an embodiment, the electronic device 201 may further include a storage device (or storage medium) such as a hard drive.

The sensor module 240 may measure a physical quantity or detect an operational state of the electronic device, and convert the measured or detected information into an electric signal. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, red, green, and blue (RGB) sensor), a biometric sensor 240I, a temperature/humidity sensor 240J, an illumination sensor 240K, and a Ultra Violet (UV) sensor 240M. Additionally or alternatively, the sensor module 240 may include, for example, an E-nose sensor (not illustrated), an electromyography (EMG) sensor (not illustrated), an electroencephalogram (EEG) sensor (not illustrated), an electrocardiogram (ECG) sensor (not illustrated), an Infrared (IR) sensor (not illustrated), an iris sensor (not illustrated), and a fingerprint sensor (not illustrated). The sensor module 240 may further include a control circuit for controlling one or more sensors included therein.

The input device 250 may include a touch panel 252, a (digital) pen sensor 254, a key 256, or an ultrasonic input device 258. The touch panel 252 may recognize a touch input in at least one of, for example, a capacitive type, a resistive type, an infrared type, and an acoustic wave type. Further, the touch panel 252 may further include a control circuit. In the case of the capacitive type touch panel, physical contact or proximity detection is possible. The touch panel 252 may further include a tactile layer. In this event, the touch panel 252 may provide a tactile response to the user.

The (digital) pen sensor 254 may be implemented, for example, using a method that is the same as or similar to receiving a user's touch input, or using a separate recognition sheet. The key 256 may include, for example, a physical button, an optical key, or a keypad. The ultrasonic input device 258 may identify data by detecting an acoustic wave with a microphone (for example, a microphone 288) of the electronic device 201 through an input unit generating an ultrasonic signal, and may perform wireless detection. According to an embodiment, the electronic device 201 may also receive a user input from an external device (for example, a computer or a server) connected thereto by using the communication module 220.

The display 260 (for example, the display 150) may include a panel 262, a hologram device 264, or a projector 266. The panel 262 may be, for example, a Liquid Crystal Display (LCD) and an Active Matrix Organic Light Emitting Diode (AM-OLED) display, and the like. The panel 262 may be implemented so as to be, for example, flexible, transparent, or wearable. The panel 262 may be integrated with the touch panel 252 to configure one module. The hologram device 264 may show a stereoscopic image in the air by using interference of light. The projector 266 may project light onto a screen to display an image. The screen may be located, for example, inside or outside the electronic device 201. According to an embodiment, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-subminiature (D-sub) 278. The interface 270 may be included in, for example, the communication interface 160 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may bilaterally convert a sound and an electronic signal. At least some elements of the audio module 280 may be included in, for example, the input/output interface 140 illustrated in FIG. 1. The audio module 280 may process sound information input or output through, for example, the speaker 282, the receiver 284, the earphones 286, the microphone 288 or the like.

The camera module 291 is a device that can take still and moving images, and according to an embodiment, may include one or more image sensors (for example, a front sensor or a rear sensor, not shown), a lens (not shown), an image signal processor (ISP) (not shown), or a flash (for example, an LED or a xenon lamp, not shown). The power management module 295 may manage power of the electronic device 201. Although not illustrated, the power management module 295 may include, for example, a Power Management Integrated Circuit (PMIC), a charger Integrated Circuit (IC), or a battery or fuel gauge.

The PMIC may be mounted to, for example, an integrated circuit or an SoC semiconductor. Charging methods may be classified into a wired charging method and a wireless charging method. The charger IC may charge a battery and prevent over voltage or over current from a charger. According to an embodiment, the charger IC may include a charger IC for at least one of the wired charging and the wireless charging. Examples of the wireless charging may include magnetic resonance charging, magnetic induction charging, and electromagnetic charging. Further, an additional circuit, such as a coil loop, a resonance circuit, and a rectifier, may be added for the wireless charging.

The battery gauge may measure, for example, a remaining quantity of the battery 296, or a voltage, a current, or a temperature during charging. The battery 296 may store or generate electricity, and may supply power to the electronic device 201 by using the stored or generated electricity. The battery 296 may include, for example, a rechargeable battery or a solar battery.

The indicator 297 may display a specific status of the electronic device 201 or a part thereof (for example, the AP 210), for example, a booting status, a message status, or a charging status. The motor 298 may convert an electrical signal into a mechanical vibration. Although not illustrated, the electronic device 201 may include a processing device (for example, a GPU) for supporting a mobile TV. The processing device for supporting the mobile TV may process media data according to a standard of Digital Multimedia Broadcasting (DMB), Digital Video Broadcasting (DVB), media flow or the like.

Each of the above described elements of the electronic device according to various embodiments of the present invention may be formed of one or more components, and the name of a corresponding element may vary according to the type of an electronic device. The electronic device according to various embodiments of the present invention may include at least one of the above described elements and may exclude some of the elements or further include other additional elements. Further, some of the elements of the electronic device according to various embodiments of the present invention may be coupled to form a single entity while performing the same functions as those of the corresponding elements before the coupling.

Hereinafter, a group paging method of an electronic device and an electronic device thereof according to various embodiments of the present invention will described in detail.

An electronic device according to various embodiments of the present invention may be various types of electronic devices such as a smart phone, a tablet PC, or various measuring devices (for example, devices for measuring water, electricity, gas, or radio wave), and may include all or some of the elements illustrated in FIGS. 1 and 2.

Figure 3:
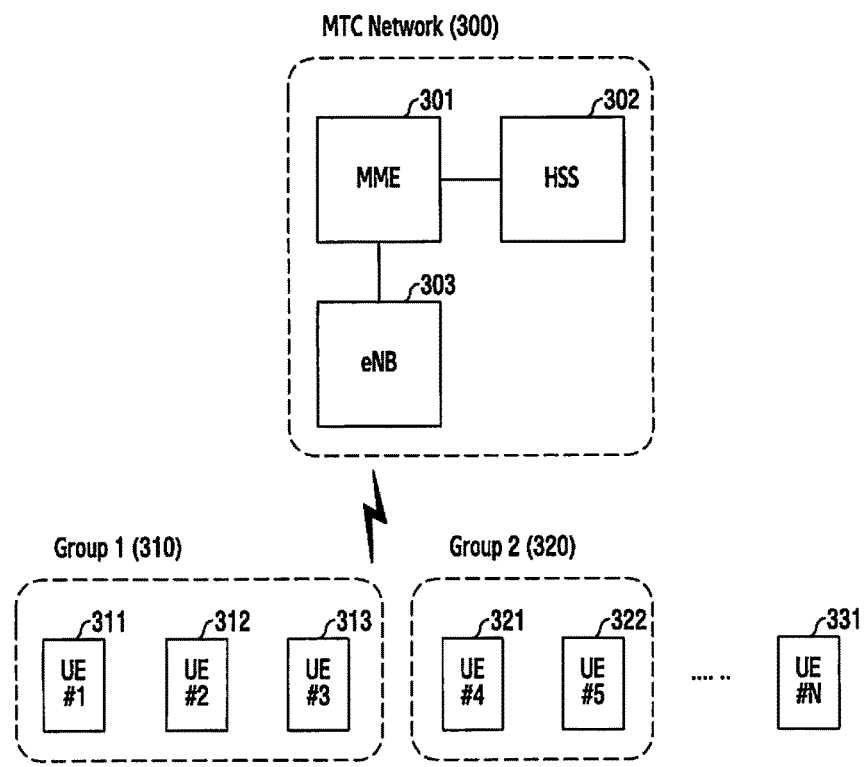
FIG. 3 illustrates an MTC network environment according to various embodiments of the present invention.

FIG. 3 illustrates an MTC network environment according to various embodiments of the present invention. Referring to FIG. 3, the MTC network 300 may include a Mobility Management Entity (MME) 301, a Home Subscriber Server (HSS) 302, and an evolved Node B (eNB) 303. Hereinafter, the mobility management entity is referred to as an "MME", the home subscriber server is referred to as an "HSS", and the evolved Node B is referred to as an "eNB".

A plurality of User Equipments (UEs) corresponding to MTC terminals that transmit and/or receive an MTC message through the MTC network 300 may be grouped into, for example, a plurality of groups as illustrated in FIG. 3. Hereinafter, the user equipment is referred to as a "UE".

For example, a first group (group 1) 310 may be a group of UEs that subscribe to a first additional service (for example, a water metering service) among the various MTC additional services, and a second group (group 2) may be a group of UEs that subscribe to a second additional service (for example, a gas metering service) among the various MTC additional services.

The first group 310 may include first to third UEs 311, 312, and 313 that subscribe to the first additional service (for example, the water metering service) and the second group 320 may include fourth and fifth UEs 321 and 322 that subscribe to the second additional service (for example, the gas metering service). Further, a UE (not shown) that subscribes to both the first additional service and the second additional service may be overlappingly included in the first group 310 and the second group 320.

The HSS 302 may store and manage various types of subscription information of a plurality of UEs having subscribed to the MTC additional services in various schemes such as files, and the MME 301 may generate a paging message with reference to the subscription information stored in the HSS 302 and may then transmit the generated paging message to at least one UE through the eNB 303.

For example, the subscription information stored in the HSS 302 may include group identification information (for example, a GROPU_ID) and an international mobile subscriber identity (IMSI) for the UEs 311, 312, and 313 of the first group 310 having subscribed to the first additional service (for example, the water metering service) among the various MTC additional services.

The subscription information stored in the HSS 302 may include a GROPU_ID and an IMSI for the UEs 321 and 322 of the second group 320 having subscribed to the second additional service (for example, the gas metering service) among the various MTC additional services.

The MME 301 may generate a group paging message that is valid for the UEs 311, 312, and 313 of the first group 310 having subscribed to the first additional service (for example, the water metering service) among the MTC additional services with reference to the subscription information stored in the HSS 302 and may then transmit the generated group paging message through the eNB 303.

The MME 301 may generate a group paging message that is valid for the UEs 321 and 322 of the second group 320 having subscribed to the second additional service (for example, the gas metering service) among the MTC additional services with reference to the subscription information stored in the HSS 302 and then transmit the generated group paging message through the eNB 303.

The MME 301 generates a group paging message by using a Serving-Temporary Mobile Subscriber Identity (S-TMSI) defined as the standard in the MTC. Hereinafter, the serving-temporary mobile subscriber identity is referred to as an "S-TMSI".

Figure 4:
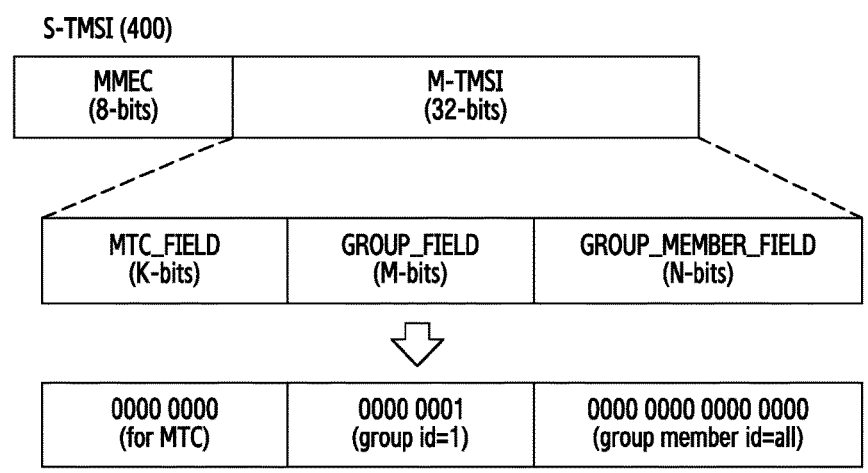
FIG. 4 illustrates a configuration of an S-TMSI according to various embodiments of the present invention.

FIG. 4 illustrates a configuration of the S-TMSI according to various embodiments of the present invention. Referring to FIG. 4, the S-TMSI consists of a total of 40 bits according to the MTC standard, and the first 8 bits of the 40 bits correspond to an MME Code (MMEC) and the remaining 32 bits correspond to MME TMSI (M-TMSI). The MME code of the 8 bits may have a unique code value to identify the corresponding MME, and the M-TMSI of the 32 bits may be changed to a predetermine value by the corresponding MME.

According to an embodiment of the present invention, the M-TMSI of the 32 bits, which can be changed to the predetermined value, may be allocated to a MTC field (MTC_FIELD) of K bits, a group field (GROUP_FIELD) of M bits, and a group member field (GROUP_MEMBER_FIELD) of N bits and then used.

A total sum of the K bits, the M bits, and the N bits may be 32 bits. When another field is added to the M-TMSI, the total sum of the K bits, the M bits, and the N bits may be smaller than 32 bits.

For example, the MTC_FIELD may be a value indicating that the corresponding message is for the MTC terminal and a unique value of 8 bits (for example, 0000 0000) may be recorded therein, and the GROUP_FIELD may be a value indicating that the corresponding message is for a particular group (for example, a first group) and a group id value of 8 bits (for example, 0000 0001) may be recorded therein.

The GROUP_MEMBER_FIELD may be a value indicating that the corresponding message is for specific UEs belonging to the particular group or all UEs belonging to the particular group, and a group member ID value of 16 bits may be recorded therein.

For example, when 16 bits recorded in the GROUP_MEMBER_FIELD are all zero (for example, 0000 0000 0000 0000) as illustrated in FIG. 4, it may indicate that the corresponding message is for all UEs included in the particular group.

Figure 5:
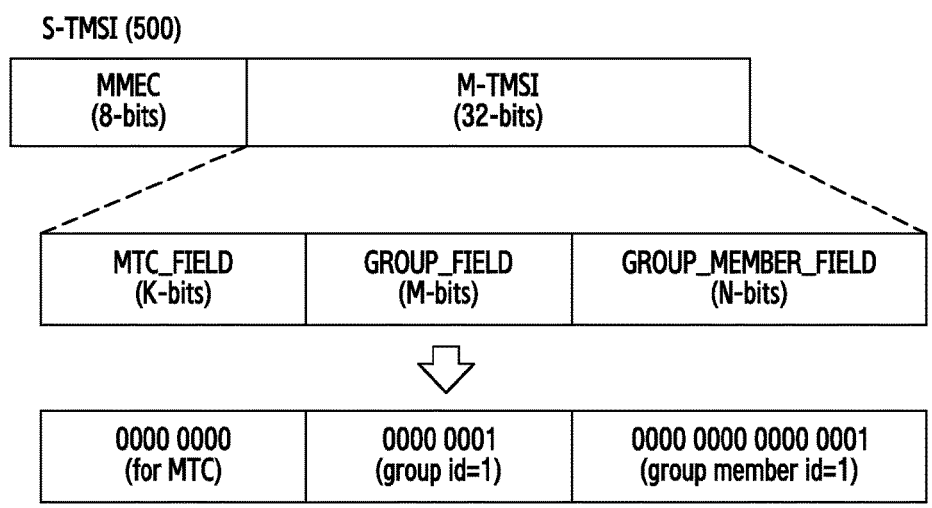
FIG. 5 illustrates another configuration of the S-TMSI according to various embodiments of the present invention.

In contrast, when at least one of the 16 bits recorded in the GROUP_MEMBER_FIELD is not zero (for example, 0000 0000 0000 0001) as illustrated in FIG. 5, it may indicate that the corresponding message is for only some specific UEs of the UEs belonging to the particular group.

FIG. 6 illustrates data 600 used for a Packet System (PS) network access mode according to various embodiments of the present invention. Referring to FIG. 6, in the HSS 302, IMSI information and NetWork (NW) access mode information may be stored as mandatory (M) parameter and international MS ISDN number information may be stored as a conditional (C) parameter. This follows the 3GPP standard that is the known technology.

According to an embodiment of the present invention, group ID information for grouping UEs having subscribed to various MTC additional services (for example, a water metering service, a gas metering service, and the like) into groups corresponding to the additional services may be stored in the HSS 302 as the mandatory (M) parameter, and the group ID information may be provided to the MME 301 and used for an operation of generating the group paging message. For reference, TYPE of FIG. 6 indicates whether the corresponding parameter is a Permanent (P) parameter or a Temporary (T) parameter.

For example, when the first UE 311 subscribes to the first additional service (for example, the water metering service) among the MTC additional services, the HSS 302 may store subscription information of the first UE 311 and further group and manage the first UE 311 to be a group (for example, a first group) corresponding to the first additional service.

When the first UE 311 attaches to the MME 301, the MME 301 generates an S-TMSI for the first UE 311 with reference to the subscription information stored in the HSS 302 and transmit an attach accept message including the S-TMSI to the first UE 311.

Further, the MME 301 may generate an individual paging message to be transmitted to the first UE 311 or a group paging message to be transmitted to the group (for example, the first group 310) to which the first UE 311 belongs, and then transmit the generated individual paging message and group paging message through the eNB 303.

The application processor 210 of FIG. 2 (or the processor of FIG. 1) included in the first UE 311 may control the communication module 220 of FIG. 2 to receive the individual paging message or the group paging message transmitted through the MTC and, when the received individual paging message or group paging message is a valid message, perform a function (for example, water metering or gas metering) corresponding to the message.

The user of the first UE 311 may release the additional service (for example, the water metering service) to which the first UE 311 has subscribed, and subscribe to another additional service (for example, the gas metering service). Accordingly, the HSS 302 changes the subscription information of the first UE 311. At this time, group information allocated to the first UE 311 may be changed (for example, from the first group to the second group).

When the MME 301 receives the changed subscription information of the first UE 311 from the HSS 302, the MME 301 should transmit an S-TMSI changed to be suitable for the first UE 311 and then transmit the generated S-TMSI. The MME 301 may transmit the changed S-TMSI to the first UE 311 by using a Globally Unique Temporary Identifier (GUTI) reallocation command.

Figure 7:
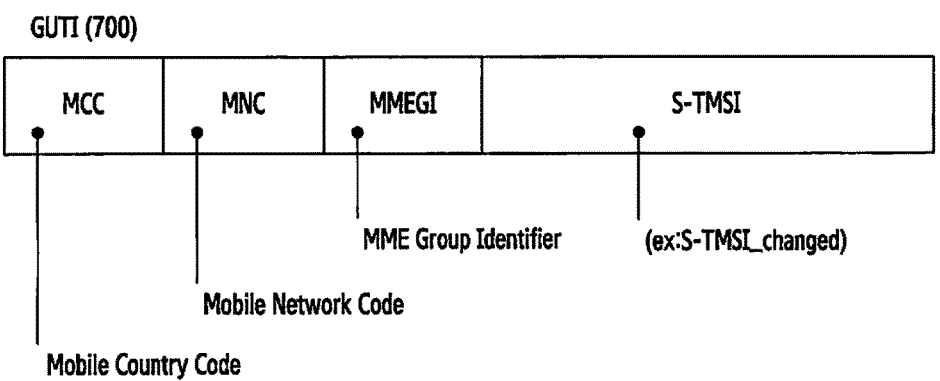
FIG. 7 illustrates a configuration of a GUTI according to various embodiments of the present invention.

For example, as illustrated in FIG. 7, GUTI 700 included in the GUTI reallocation command may include a Mobile Country Code (MCC), a Mobile Network Code (MNC), an MME Group Identifier (MMEGI), and an S-TMSI, and the S-TMSI changed to be suitable for the first UE 311 may be recorded.

When the first UE 311 receives the GUTI reallocation command transmitted by the MME 301, the first UE 311 may extract and identify the S-TMSI included in the GUTI of the GUTI reallocation command and change a group ID allocated to itself (for example, from a first group ID to a second group ID).

Figure 8:
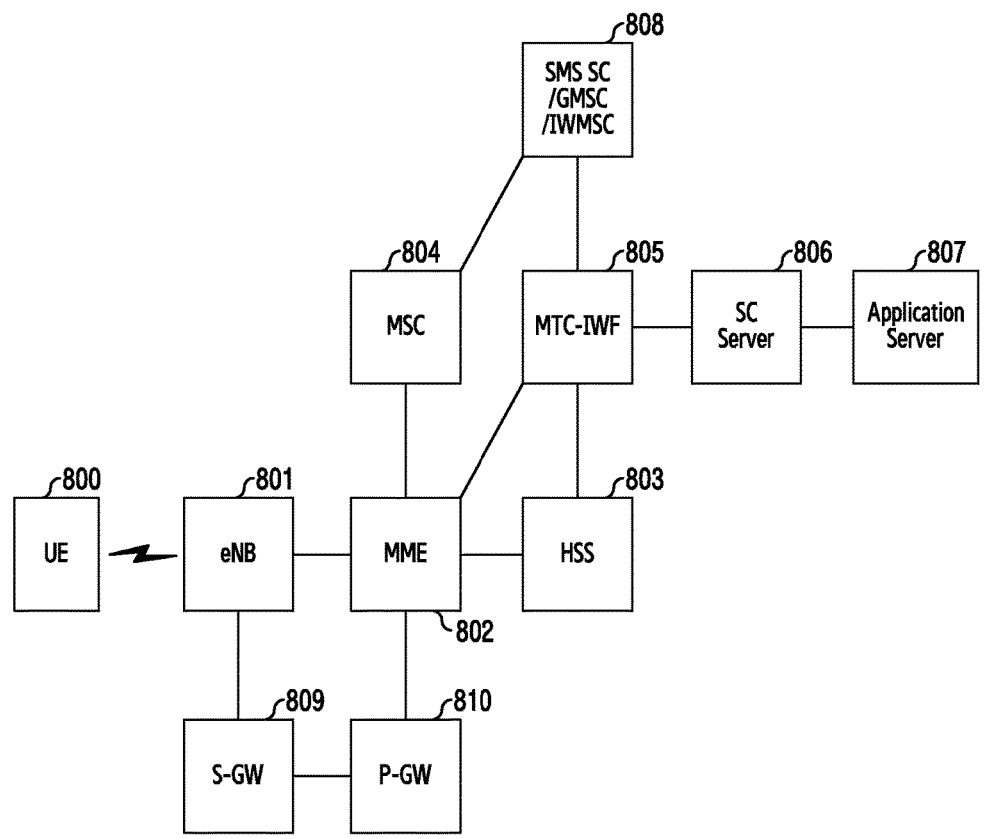
FIG. 8 illustrates an MTC network environment in detail according to various embodiments of the present invention.

FIG. 8 illustrates an MTC network environment according to various embodiments of the present invention. Referring to FIG. 8, the MTC network environment may include a UE 800, an eNB 801, an MME 802, and an HSS 803, and may also include a Mobile Switching Center (MSC) 804, an MTC-Interworking Function (IWF) 805, a Service Capability (SC) server 806, an application server 807, a Short Message Service Center (SMS SC)/Gateway MSC (GMSC)/Interworking MSC (IMSC) 808, a Serving Gateway (S-GW) 809, and a Packet data network Gateway (P-GW) 810.

The application server 807 is a server for executing various application programs through an interworking with an MTC device and may provide a water metering service or a gas metering service by executing, for example, a water metering application or a gas metering application.

The application server 807 may trigger an MTC group having subscribed to a particular additional service in order to provide the particular additional service (for example, the water metering service). For example, the triggering may be performed by transmission of an SMS to the SMS-SC 808 from the MTC-IWF 805 or performed by transmission of a command to the MME 802 from the MTC-IWF 805.

The UE 800 may perform a Discontinuous Reception (DRX) operation in which the MTC message is received while periodically repeating an idle state and a wakeup state. To this end, the UE 800 may calculate each of an individual paging check time for checking an individual paging message transmitted to the UE 800 itself and a group paging check time for receiving a group paging message transmitted to a group to which the UE 800 itself belongs.

As illustrated in FIG. 9, the individual paging check time 900 is calculated by a first calculation formula (SFN mod T=(T div N)*UE_ID mod (N), UE_ID=IMSI mod 1024) that determines the paging check time based on a unique UE_ID assigned to the UE 800, which is the already known calculation formula.

In contrast, as illustrated in FIG. 9, the group paging check time 910 may be calculated by a second calculation formula (SFN mod T=(T div N)*GROUP_ID mod (N)) that determines the paging check time based on a unique GROUP_ID assigned to the particular group to which the UE 800 belongs.

For example, when the GROUP_ID of the particular group to which the UE 800 belongs is 8, IMSI values generated when a result of IMSI mode 1024 is 8 may be reversely calculated, and a predetermined IMSI value, which can be used by the MME 802, among the IMSI values causing the result of 8 may be selected as a pseudo IMSI value and applied to the second calculation formula.

For example, when T=128, N=32, and GROUP_ID=8, (128 div 32)*(8 mode 32)=32 through the second calculation formula. Therefore, the UE checks paging in a $32^{th}$ frame.

A plurality of UEs belonging to the particular group may become the wakeup state at the same group paging check time and thus check the same group paging message.

Figure 10:
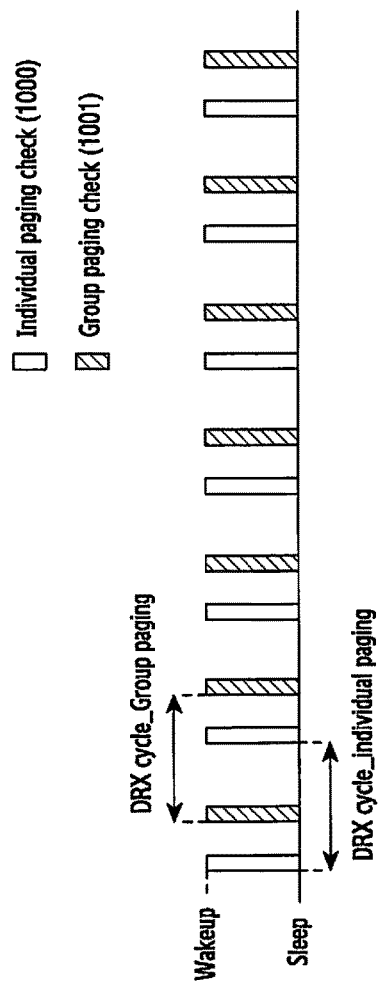
FIG. 10 illustrating an individual paging check timing and a group paging check timing according to various embodiments of the present invention.

FIG. 10 illustrates an individual paging check timing and a group paging check timing according to various embodiments of the present invention. Referring to FIG. 10, the UE 800 may check the individual paging message transmitted to the UE 800 while repeating the idle and wakeup states on a DRX cycle_Individual paging cycle corresponding to the individual paging check time 1000, and may check the group paging message transmitted to the group to which the UE 800 belongs while repeating the idle and wakeup states on a DRX cycle_Group paging cycle corresponding to the group paging check time 1001.

Since the DRX cycle_Individual paging cycle and the DRX cycle_Group paging cycle do not overlap each other or, extremely, a part therebetween overlaps, the UE 800 may consume a lot of power in a process of checking the paging message.

Figure 11:
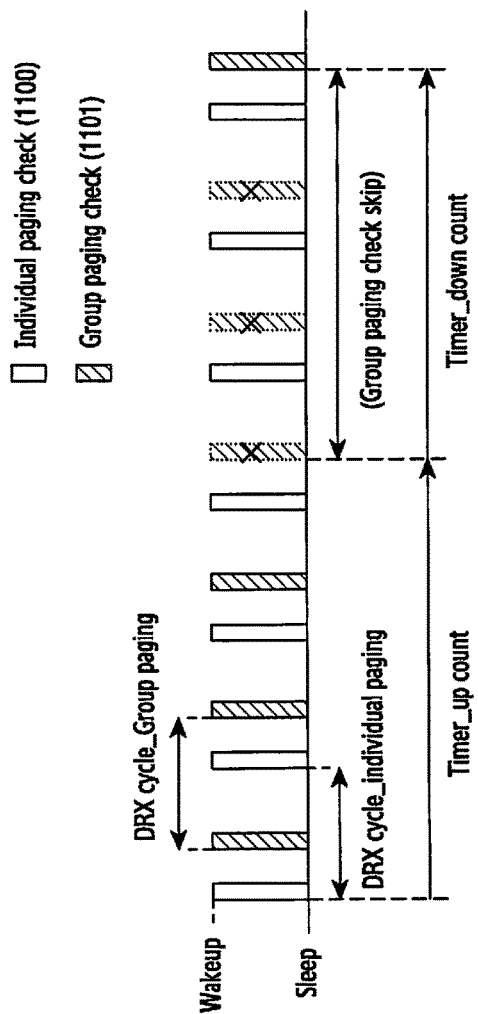
FIG. 11 illustrates another embodiment for the individual paging check timing and the group paging check timing according to various embodiments of the present invention.

According to various embodiments of the present invention, as illustrated in FIG. 11, the DRX cycle_Individual paging cycle for checking the individual paging message may be applied without any change and the DRX cycle_Group paging cycle for checking the group paging message may be skipped for a preset time by a timer that counts a predetermined time.

For example, when a timer that up-counts for 20 seconds and down-counts for 20 minutes is used, both the DRX cycle_Individual paging cycle and the DRX cycle_Group paging cycle may be used for the up-counting time of 20 seconds, and the DRX cycle_Individual paging cycle may be applied but the DRX cycle_Group paging cycle may be skipped for the down-counting time of 20 minutes.

That is, the DRX cycle_Individual paging cycle may be applied without any change to the individual paging message that is required to be transmitted/received in real time, and the group paging message check operation may be skipped for a predetermined time of the DRX cycle_Group paging cycle with respect to the group paging message that is not required to be transmitted/received in real time, thereby reducing power consumption of the UE 800.

Other timers as well as the up/down counting timer may be used, and the timer value may be provided to the UE 800 through an attach accept message or a Tracking Area Update (TAU) message transmitted by the MME 802 or provided through various download methods when the UE 800 initially accesses the MTC network.

Figure 12:
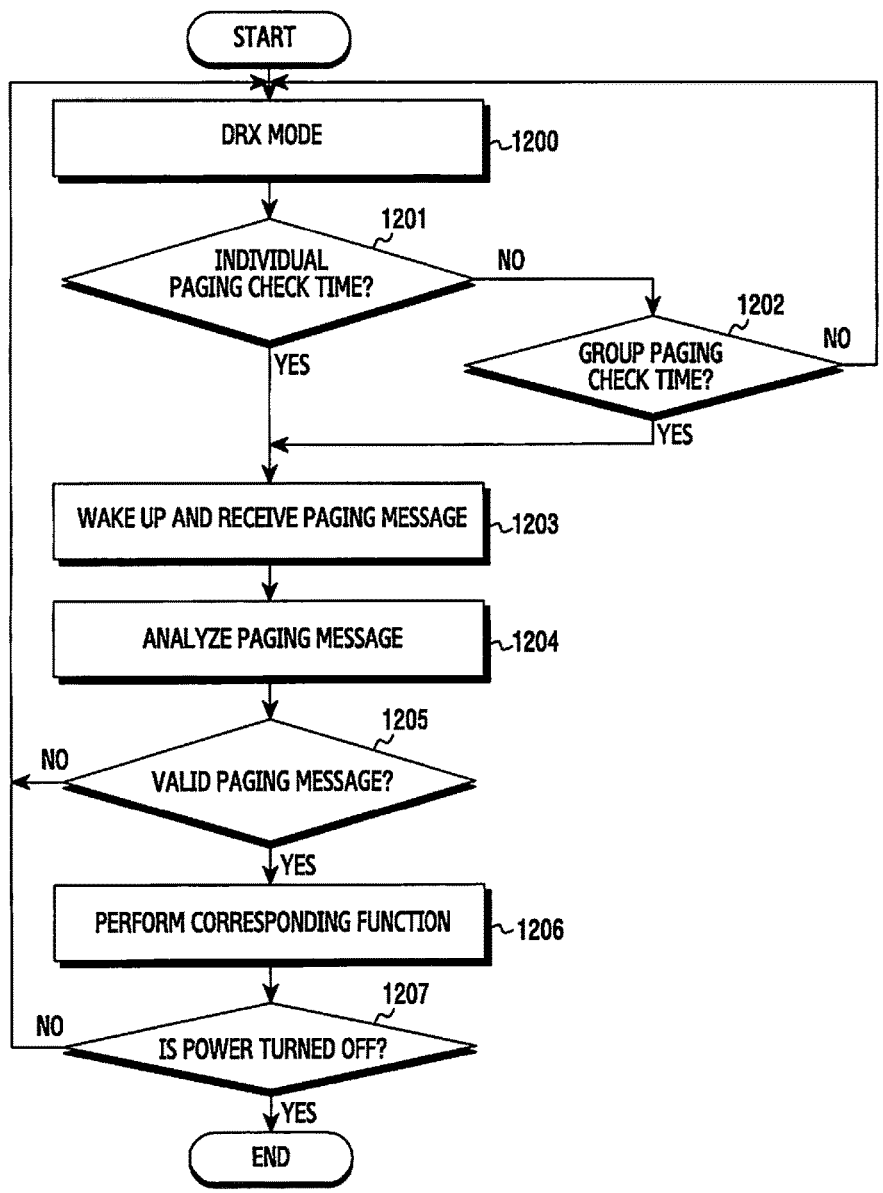
FIG. 12 is a flowchart illustrating an operation of a group paging method of an electronic device according to various embodiments of the present invention.

FIG. 12 is a flowchart illustrating an operation of a group paging method of the electronic device according to various embodiments of the present invention. The electronic device may be one or more of a smart phone, a table PC, and various metering devices (for example, a water meter, a gas meter, a thermometer, and an atmosphere measurement instrument). The electronic device may be referred to as the UE in the MTC network environment.

Referring to FIG. 12, in operation 1200, a DRX mode in which the MTC message is discontinuously received while the idle state and the wakeup state is periodically repeated is set in the UE 800.

For example, as described with reference to FIG. 9, the UE 800 may monitor the individual paging check time calculated based on its own UE_ID and the group paging check time calculated based on the GROUP_ID to which the UE 800 belongs. When the current time is the individual paging check time in operation 1201 or when the current time is the group paging check time in operation 1202, the UE 800 may switch from the idle state to the wakeup state and then receive an individual paging message or a group paging message transmitted through the MTC network.

In contrast, when the current time is neither the individual paging check time nor the group paging check time, the UE 800 may monitor the individual paging check time and the group paging check time while maintaining the idle state.

In the operation of receiving the individual paging message, for example, the UE 800 may check and receive the individual paging message transmitted to the UE 800 while repeating the idle and wakeup states on the DRX cycle_Individual paging cycle as described above with reference to FIG. 10.

In the operation of receiving the group paging message, for example, the UE 800 may check and receive the group paging message transmitted to the group to which the UE 800 belongs while repeating the idle and wakeup states on the DRX cycle_Group paging cycle as described above with reference to FIG. 10.

The UE 800 may analyze the received paging message in operation 1204 and, when the analyzed paging message is a valid paging message in operation 1205, perform a function (for example, water metering or gas metering) corresponding to the paging message in operation 1206.

In contrast, when the analyzed paging message is not the valid paging message, the UE 800 may return to operation 1201 and then repeatedly perform a series of operations as described above until power is turned off in operation 1207. The operation of determining whether the paging message is the valid paging message will be described below in detail.

Figure 13:
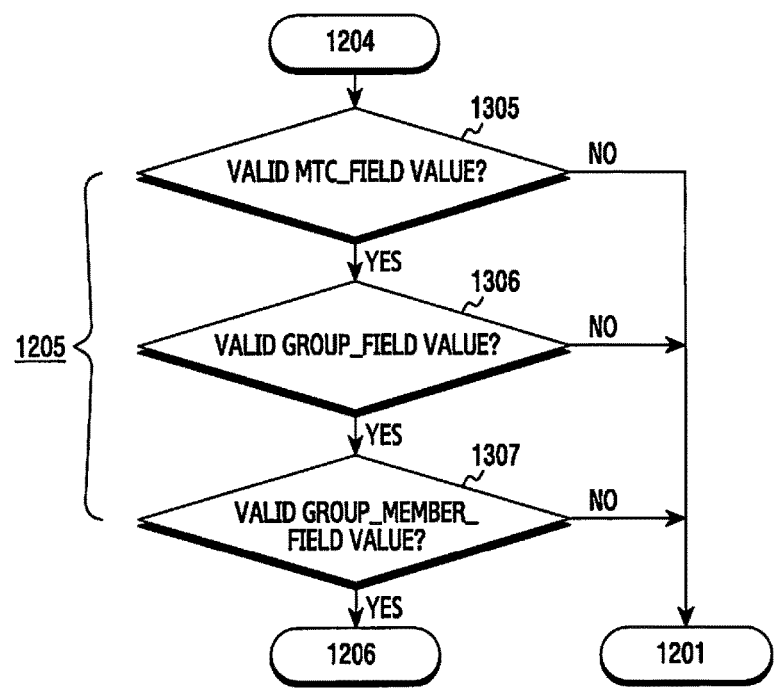
FIG. 13 is a flowchart illustrating an operation of a method of determining the validity of a paging message according to various embodiments of the present invention.

FIG. 13 is a flowchart illustrating an operation of a method of determining the validity of a paging message according to various embodiments of the present invention. As described above with reference to FIGS. 4 and 5, the paging message includes an S-TMSI of 40 bits, wherein the first 8 bits of the S-TMSI of the 40 bits correspond to an MMEC and the remaining 32 bits correspond to an M-TMSI. The M-TMSI of the 32 bits may include an MTC_FIELD of K bits, a MTC_FIELD of M bits, and a GROUP_MEMBER_FIELD of N bits.

Referring to FIG. 13, when a value of the MTC_FIELD is a unique value (for example, 0000 0000) indicating that the corresponding message is a message for the MTC terminal in operation 1305, the UE 800 may determine that the MTC_FIELD is a valid MTC_FIELD.

When a value of the GROUP_FIELD is a group ID value (for example, 0000 0001) indicating a group (for example, a first group) to which the UE 800 belongs in operation 1306, the UE 800 may determine that the GROUP_FIELD is a valid GROUP_FIELD.

When a value of the GROUP_MEMBER_FIELD is a group member ID value (for example, 0000 0000 0000 0000) indicating all UEs within the group (for example, the first group) to which the UE 800 belongs as described above with reference to FIG. 4 or when the group member ID has a value (for example, 0000 0000 0000 0001) for designating only the UE 800 as described above with reference to FIG. 5, the UE 800 may determine that the GROUP_MEMBER_FIELD is a valid GROUP_MEMBER_FIELD and may then perform operation 1206.

In contrast, when at least one of the MTC_FIELD, GROUP_FIELD, and GROUP_MEMBER_FIELD is not valid, the UE 800 may determine that the paging message is not valid and return to operation 1201.

Figure 14:
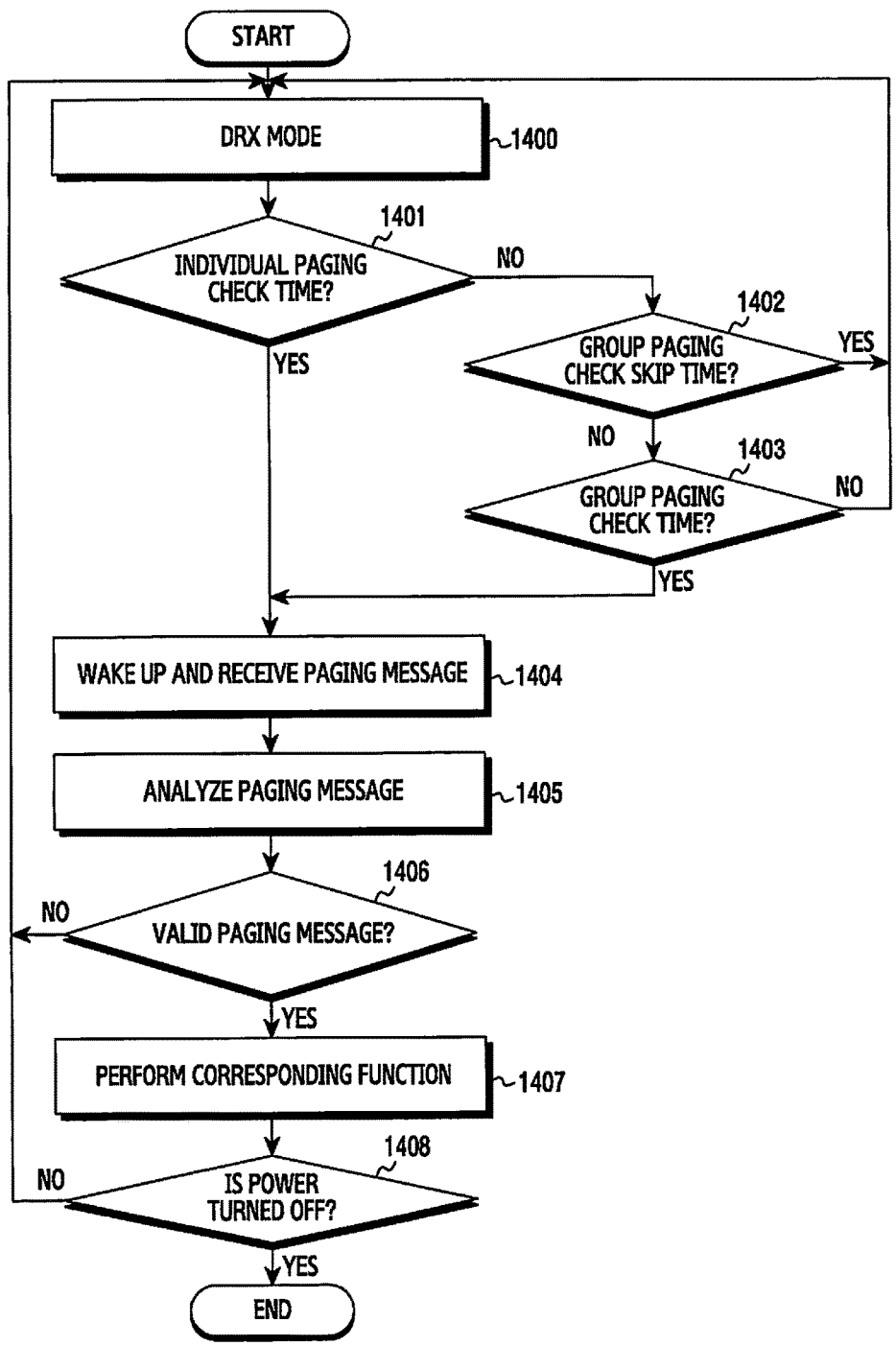
FIG. 14 is a flowchart illustrating an operation of another embodiment for the group paging method of the electronic device according to various embodiments of the present invention.

FIG. 14 is a flowchart illustrating an operation of another embodiment for the group paging method of the electronic device according to various embodiments of the present invention. For example, as described above with reference to FIG. 10, since the DRX cycle_Individual paging cycle for receiving the individual paging message and the DRX cycle_Group paging cycle for receiving the group paging message may not overlap each other or, extremely, a part therebetween may overlap, the UE 800 may consume much power in checking the paging message.

According to various embodiments of the present invention, as illustrated in FIG. 11, the DRX cycle_Individual paging cycle for checking the individual paging message may be applied without any change and the DRX cycle_Group paging cycle for checking the group paging message may be skipped for a preset time by a timer that counts a predetermined time.

That is, the DRX cycle_Individual paging cycle may be applied without any change to the individual paging message that is required to be transmitted/received in real time, and the group paging message check operation may be skipped for a predetermined time of the DRX cycle_Group paging cycle with respect to the group paging message that is not required to be transmitted/received in real time, thereby reducing power consumption of the UE 800.

Referring to FIG. 14, in operation 1400, a DRX mode in which the MTC message is discontinuously received while the idle state and the wakeup state are periodically repeated may be set in the UE 800.

The UE 800 may identify whether the current time is an individual paging check time in operation 1401, identify whether the current time is a group paging check skip time in operation 1402, and identify whether the current time is a group paging check time in operation 1403.

When the current time is the individual paging check time or the group paging check time except for the group paging check skip time based on a result of the identification, the UE 800 may switch from the idle state to the wakeup state and then receive an individual paging message or a group paging message transmitted through the MTC network in operation 1404.

The UE 800 may analyze the received paging message in operation 1405 and, when the analyzed paging message is a valid paging message in operation 1406, perform a function (for example, water metering or gas metering) corresponding to the paging message in operation 1407.

In contrast, when the analyzed paging message is not the valid paging message, the UE 800 may return operation 1401 and then repeatedly perform a series of operations as described above until power is turned off in operation 1408. The operation of determining whether the paging message is the valid paging message has been already described with reference to FIG. 13.

The methods as described in the claims or specification according to various embodiments of the present invention may be implemented by hardware, software, or a combination of hardware and software. In the implementation of software, a computer-readable storage medium for storing one or more programs (software modules) may be provided. The one or more programs stored in the computer-readable storage medium may be configured for execution by one or more processors 120 within the electronic device. The at least one program may include instructions that cause the electronic device to perform the methods according to various embodiments of the present invention as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In various specific embodiments of the present invention as described above, an element or elements included in the present invention are expressed in a singular form or plural form according to the presented specific embodiments. However, the singular form or plural form is selected for convenience of description suitable for the presented situation, and various embodiments of the present invention are not limited to a single element or multiple elements thereof. Further, either multiple elements expressed in the description may be configured into a single element or a single element in the description may be configured into multiple elements.

Meanwhile, while the invention has been shown and described with reference to specific embodiments thereof in the detailed description of the present invention, it goes without saying that various changes in form and details may be made therein without departing from the spirit and scope of the invention. Therefore, the scope of the present invention should not be defined as being limited to the embodiments, but should be defined by the appended claims and equivalents thereof.

The invention claimed is:

1. A method of an electronic device, the method comprising:
checking a group paging check time while the electronic device operates in a discontinuous reception (DRX) mode;
switching from an idle state to a wakeup state based on a result of the checking;
receiving a group paging message through a machine type communication (MTC) in the wakeup state;
identifying, from the group paging message, first information indicating whether the group paging message is a message for an MTC electronic device, second information indicating a group, and third information indicating at least one electronic device included in the group;
determining a validity of a group paging message based on the first information, the second information, and the third information; and
if the group paging message is valid, performing a particular function.

2. The method of claim 1, wherein the group paging check time corresponds to a DRX cycle calculated based on a group ID assigned to a particular group to which the electronic device belongs.

3. The method of claim 2, wherein the DRX cycle is skipped for a predetermined time by a timer.

4. The method of claim 1, wherein the group paging message includes a serving temporary mobile subscriber identity (S-TMSI), S-TMSI includes a mobility management entity code (MMEC) and a mobility management entity temporary subscriber identity (M-TMSI), and the M-TMSI includes a MTC field, a group field, and a group member field.

5. The method of claim 4, wherein the MTC field includes the first information, the group field includes the second information, and the group member field includes the third information.

6. The method of claim 5, wherein the second information and an international mobile subscriber identity (IMSI) are stored and updated within a home subscriber server (HSS) of a MTC network.

7. The method of claim 5, wherein the third information is randomly generated by a mobile management entity (MME) of a MTC network.

8. The method of claim 5, wherein the determining of the validity comprises determining whether the first information, the second information, and the third information are all valid.

9. The method of claim 8, wherein the determining of the validity comprises determining that the group paging message is not valid if at least one of the first information, the second information, and the third information is not valid.

10. The method of claim 1, wherein the performing of the particular function comprises performing a particular function corresponding to an additional service to which the electronic device has subscribed according to the group paging message.

11. An electronic device comprising:
a communication module configured to support a machine type communication (MTC); and
a processor configured to control the communication module,
wherein the processor is configured to:
check a group paging check time while the electronic device operates in a discontinuous reception (DRX) mode;
switch from an idle state to a wakeup state based on a result of the checking;
receive a group paging message through the MTC in the wakeup state;
identify, from the group paging message, first information indicating whether the group paging message is a message for a MTC electronic device, second information indicating a group, and third information indicating at least one electronic device included in the group;
determine a validity of a group paging message based on the first information, second information, and the third information; and
perform a particular function if the group paging message is valid.

12. The electronic device of claim 11, wherein the group paging check time corresponds to a DRX cycle calculated based on a group ID assigned to a particular group to which the electronic device belongs.

13. The electronic device of claim 12, wherein the DRX cycle is skipped for a predetermined time by a timer.

14. The electronic device of claim 11, wherein the group paging message includes a serving temporary mobile subscriber identity (S-TMSI), the S-TMSI includes a mobility management entity code (MMEC) and a mobility management entity temporary subscriber identity (M-TMSI), and the M-TMSI includes a MTC field, a group field, and a group member field.

15. The electronic device of claim 14, wherein the MTC field includes the first information, the group field includes the second information, and the group member field includes the third information.

16. The electronic device of claim 15, wherein the second information and an international mobile subscriber identity (IMSI) are stored and updated within a home subscriber server (HSS) of a MTC network.

17. The electronic device of claim 15, wherein the third information is randomly generated by a mobile management entity (MME) of a MTC network.

18. The electronic device of claim 15, wherein the processor is configured to determine that the group paging message is not valid if at least one of the first information, the second information, and the third information is not valid.

19. The electronic device of claim 11, wherein the processor is configured to perform a particular function corresponding to an additional service to which the electronic device has subscribed according to the group paging message.

20. A non-transitory computer-readable recording medium having a program recorded thereon, which, when, executed by an electronic device, causes the electronic device to perform operations comprising:
checking a group paging check time while the electronic device operates in a discontinuous reception (DRX) mode;
switching from an idle state to a wakeup state based on a result of the checking;
receiving a group paging message through a machine type communication (MTC) in the wakeup state;
identifying, from the group paging message, first information indicating whether the group paging message is a message for a MTC electronic device, second information indicating a group, and third information indicating at least one electronic device included in the group;
determining a validity of a group paging message based on the first information, the second information, and the third information; and
if the group paging message is valid, performing a particular function.

* * * * *